UNITED STATES PATENT OFFICE.

WILLIAM N. BLAKEMAN, JR., OF NEW YORK, N. Y.

PAINT COMPOUND.

1,019,415. Specification of Letters Patent. Patented Mar. 5, 1912.

No Drawing. Application filed June 30, 1911. Serial No. 636,236.

*To all whom it may concern:*

Be it known that I, WILLIAM N. BLAKEMAN, Jr., a citizen of the United States, and resident of the borough of Manhattan, in the city, county, and State of New York, have invented a new and useful Paint Compound, which invention is fully set forth in the following specification.

The object of this invention is to make an economical paint compound which will dry satisfactorily and be durable and permanent; and the invention consists in combining lead chlorid with a pigment and an oil-vehicle as will now be described.

In carrying out my invention, I employ those pigments, sometimes called anhydrous, which carry no combined water, and which are ordinarily deficient in spreading and drying properties when ground in the usual drying-oil vehicle; such, for example, as zinc oxid, zinc sulfid, lead carbonate, lead sulfate, lead oxysulfate, lead sulfite, sublimed lead, zinc-lead, barium sulfate, barium carbonate, strontium sulfate, and strontium carbonate; or any combination of these pigments. I have obtained the most satisfactory results by using zinc pigments. If the lead or other pigments named, be used, it may be found advantageous to combine therewith a percentage of zinc oxid or zinc sulfid. As an oil-vehicle, any of the fatty oils may be used, but, for economical reasons, I prefer to employ those fatty oils, known as non-drying, slow drying, semi-drying, medium drying, and greasy oils, which do not dry satisfactorily when used with hydrated pigments, and which may all be regarded, for practical paint purposes, as non-drying oils; such, for example, as menhaden oil or other marine animal oil; cotton oil; sunflower oil; corn oil; or any other oil in this class which may be found economical. These oils may be used either singly or combined, and in either a raw or oxidized state; but, as they vary somewhat in their behavior toward the anhydrous pigments, the marine animal oils being superior in drying characteristics while the vegetable oils are superior in spreading power, the ultimate result will be more satisfactory if the oils be compounded instead of being used singly. Taking, for example, 100 parts of menhaden oil, either alone or carrying say 5 per cent. of cotton or sunflower oil, I incorporate therewith 14 parts of lead chlorid and 70 parts of zinc oxid. I prefer to grind the lead chlorid in the oil first, to a milky consistency, and then add the pigment, as in this way, the pigment will be more thoroughly covered and combined with the chlorid. If desired, however, the pigment may be ground in the oil first and the chlorid then added, or the chlorid and the pigment may be ground in the oil simultaneously. The lead chlorid appears to unite with both the pigment and the oil and acts as a bond between them, the result being that increased spreading power is imparted to the pigment and accelerated drying power to the oil, so that, when the compound, with the usual quantity of liquid drier added, is spread as a paint, it will dry satisfactorily and form a cheap and permanent protective covering.

Instead of using a non-drying-oil or oils, as a sole vehicle, the spreading power, drying characteristics and indurated result of the paint compound, when spread as a film, will be further improved by an admixture of drying oils, raw or oxidized, such as tung oil and linseed oil. I prefer tung oil, owing to its remarkable affinity for the chlorids. From 10 to 15 per cent. of tung oil for menhaden oil, and 15 to 18 per cent. for cotton or sunflower oil, will be found efficacious, although half tung and half linseed may be used.

The proportions of vehicle, pigment and chlorid can be easily regulated in practice, and may be considerably varied and yet produce satisfactory results.

The following may be given as additional examples of satisfactory compounds:

(1) 100 parts cotton or sun-flower oil; 16 parts lead chlorid; 100 parts zinc oxid.

(2) 100 parts linseed oil; 14 parts lead chlorid; 165 parts lead carbonate, or 115 parts zinc-lead.

(3) 100 parts menhaden oil, carrying 12 per cent. of tung oil; 14 parts lead chlorid; 86 parts zinc-lead.

(4) 100 parts menhaden oil, carrying 12 per cent. of tung oil; 14 parts lead chlorid; 73 parts zinc oxid.

(5) 100 parts menhaden oil, carrying 15 per cent. of tung oil; 14 parts lead chlorid; 30 parts zinc oxid; 85 parts lead sulfate.

(6) 100 parts cotton oil, carrying 15 per cent. of tung oil; 20 parts lead chlorid; 100 parts zinc oxid.

(7) 100 parts cotton oil, carrying 15 per cent. of tung oil; 20 parts lead chlorid; 80 parts zinc oxid; 180 parts barium sulfate.

With slight variations, the proportions of oils, lead chlorid, zinc oxid, and barium sulfate may be used as a sole basis for paints.

Heat, light, pressure and agitation may be employed whenever deemed necessary.

Having thus fully described my invention, I claim:

1. A compound or mixture of a pigment deficient in spreading power; lead chlorid; and a fatty oil.
2. A compound or mixture of a pigment deficient in spreading power; lead chlorid; and a non-drying fatty oil.
3. A compound or mixture of a pigment deficient in spreading power; lead chlorid; and a non-drying marine animal oil.
4. A compound or mixture of a pigment deficient in spreading power; lead chlorid; and menhaden oil.
5. A compound or mixture of a pigment deficient in spreading power; lead chlorid; a fatty oil; and a drying oil.
6. A compound or mixture of a pigment deficient in spreading power; lead chlorid; a non-drying fatty oil; and a drying oil.
7. A compound or mixture of a pigment deficient in spreading power; lead chlorid; a non-drying marine animal oil; and a drying oil.
8. A compound or mixture of a pigment deficient in spreading power; lead chlorid; menhaden oil; and a drying oil.
9. A compound or mixture of a pigment deficient in spreading power; lead chlorid; a fatty oil; and tung oil.
10. A compound or mixture of a pigment deficient in spreading power; lead chlorid; a non-drying fatty oil; and tung oil.
11. A compound or mixture of a pigment deficient in spreading power; lead chlorid; a non-drying marine animal oil; and tung oil.
12. A compound or mixture of a pigment deficient in spreading power; lead chlorid; menhaden oil; and tung oil.
13. A compound or mixture of a zinc pigment; lead chlorid; and a fatty oil.
14. A compound or mixture of a zinc pigment; lead chlorid; and a non-drying fatty oil.
15. A compound or mixture of a zinc pigment; lead chlorid; a fatty oil; and a drying oil.
16. A compound or mixture of a zinc pigment; lead chlorid; a non-drying fatty oil; and a drying oil.
17. A compound or mixture of a zinc pigment; lead chlorid; a fatty oil; and tung oil.
18. A compound or mixture of a zinc pigment; lead chlorid; a non-drying fatty oil; and tung oil.
19. A compound or mixture of a zinc pigment; another pigment; lead chlorid; and a fatty oil.
20. A compound or mixture of a zinc pigment; another pigment; lead chlorid; and a non-drying fatty oil.
21. A compound or mixture of a zinc pigment; another pigment; lead chlorid; a non-drying fatty oil; and a drying oil.

WM. N. BLAKEMAN, Jr.

Witnesses:
FRANCIS P. REILLY,
OLIVER R. GRANT.